US010992182B2

(12) United States Patent
Eyales

(10) Patent No.: US 10,992,182 B2
(45) Date of Patent: Apr. 27, 2021

(54) ELECTROMAGNETIC ENERGY-FLUX REACTOR

(71) Applicant: Bonifacio J. Eyales, Cainta (PH)

(72) Inventor: Bonifacio J. Eyales, Cainta (PH)

(*) Notice: Subject to any disclaimer, the term of this patent is extended or adjusted under 35 U.S.C. 154(b) by 28 days.

(21) Appl. No.: 16/360,716

(22) Filed: Mar. 21, 2019

(65) Prior Publication Data
US 2019/0319491 A1 Oct. 17, 2019

Related U.S. Application Data

(63) Continuation of application No. 15/261,275, filed on Sep. 9, 2016, now Pat. No. 10,243,405, which is a continuation of application No. 13/934,072, filed on Jul. 2, 2013, now Pat. No. 9,444,264, which is a
(Continued)

(51) Int. Cl.
H02J 50/12 (2016.01)
H02M 3/24 (2006.01)
H02M 5/42 (2006.01)
H02J 50/40 (2016.01)
H02J 5/00 (2016.01)
H02K 53/00 (2006.01)

(52) U.S. Cl.
CPC ............... *H02J 50/12* (2016.02); *H02J 5/00* (2013.01); *H02J 50/40* (2016.02); *H02K 53/00* (2013.01); *H02M 3/24* (2013.01); *H02M 5/42* (2013.01); *Y02E 10/72* (2013.01)

(58) Field of Classification Search
CPC .... H02J 50/12; H02J 50/40; H02J 5/00; H02J 5/005; H02K 53/00; H02M 3/24; H02M 5/42; Y02E 10/72

USPC ........................................................ 307/104
See application file for complete search history.

(56) References Cited

U.S. PATENT DOCUMENTS 2,276,845 A 3/1942 Hubbard
3,701,067 A 10/1972 Tsubakihara
4,403,205 A 9/1983 Leibinger et al.
(Continued)

FOREIGN PATENT DOCUMENTS

CN 1085427 C 5/2002
CN 1663093 B 4/2010
(Continued)

OTHER PUBLICATIONS

International Search Report and Written Opinion for PCT Application No. PCT/IB2013/002394, dated Apr. 8, 2014, 11 pages.
(Continued)

*Primary Examiner* — Hal Kaplan
(74) *Attorney, Agent, or Firm* — Foley & Lardner LLP

(57) ABSTRACT

Systems and methods for providing power to a load are provided. One system includes a first reactor including a first plurality of coils. A first coil of the first plurality of coils is configured to generate a first magnetic field, and a plurality of second coils of the first plurality of coils are configured to generate a plurality of second magnetic fields that vary an intensity of the first magnetic field. The system further comprises a second reactor comprising a second plurality of coils, wherein the second plurality of coils are configured to tune the first reactor to the load. The first reactor is configured to provide the power to the load, and the second reactor is configured to increase the power provided to the load by increasing an intensity of the second magnetic fields generated by the second coils and tuning the first reactor to the load.

20 Claims, 11 Drawing Sheets

Related U.S. Application Data continuation-in-part of application No. PCT/PH2011/000015, filed on Sep. 23, 2011.

(56) References Cited

U.S. PATENT DOCUMENTS

| | | | |
|---|---|---|---|
| 4,687,947 | A | 8/1987 | Cobb |
| 6,069,809 | A | 5/2000 | Inoshita |
| 7,084,605 | B2 | 8/2006 | Mickle et al. |
| 7,408,268 | B1 | 8/2008 | Nocentini et al. |
| 7,542,257 | B2 | 6/2009 | McCormick et al. |
| 8,080,972 | B2 | 12/2011 | Smith |
| 8,129,958 | B2 | 3/2012 | Ku et al. |
| 8,363,426 | B2 | 1/2013 | Katargin et al. |
| 2009/0072629 | A1 | 3/2009 | Cook et al. |
| 2009/0201620 | A1 | 8/2009 | Gray et al. |
| 2010/0147371 | A1 | 6/2010 | Cho |
| 2010/0232184 | A1 | 9/2010 | Aso |
| 2011/0133488 | A1 | 6/2011 | Roberts et al. |

FOREIGN PATENT DOCUMENTS

| | | |
|---|---|---|
| CN | 202085084 U | 12/2011 |
| CN | 101882874 B | 3/2013 |
| EP | 2 196 351 A1 | 6/2010 |
| EP | 2 317 624 A1 | 5/2011 |
| EP | 2 544 201 A2 | 1/2013 |
| GB | 2 409 115 | 6/2005 |
| JP | S49-017217 | 5/1974 |
| JP | S62-176115 | 8/1987 |
| JP | H06-030579 | 2/1994 |
| JP | 05-223299 | 3/1999 |
| JP | 2007-514311 | 5/2007 |
| JP | 2009-112142 A | 5/2009 |
| JP | 2009-267360 | 11/2009 |
| JP | 2011-004460 A | 1/2011 |
| WO | WO-2011/007879 | 1/2011 |
| WO | WO-2011/033362 A2 | 3/2011 |
| WO | WO 2013/043065 A2 | 3/2013 |
| WO | WO-2013/043065 A3 | 3/2013 |
| WO | WO-2013/0430625 A2 | 3/2013 |

OTHER PUBLICATIONS

Notice of Allowance on U.S. Appl. No. 13/934,072, dated Apr. 20, 2016, 12 pages.

Notice of Allowance on U.S. Appl. No. 15/261,275 dated Jan. 25, 2019.

Notice of Allowance on U.S. Appl. No. 15/261,275 dated Nov. 9, 2018.

Office Action for Japanese Application No. 2018-017094, dated Sep. 25, 2018, 3 pages.

Office Action for Japanese Application No. 2018-027869, dated Oct. 9, 2018, 3 pages.

Office Action for Taiwanese Application No. 107133756, dated Oct. 2, 2018, 2 pages.

U.S. Notice of Allowance on U.S. Appl. No. 13/934,072 dated Aug. 16, 2016.

U.S. Office Action on U.S. Appl. No. 15/261,275 dated May 15, 2018.

ELECTROMAGNETIC ENERGY-FLUX REACTOR

CROSS-REFERENCE TO RELATED APPLICATIONS

This application is a continuation of U.S. patent application Ser. No. 15/261,275, filed on Sep. 9, 2016, which is a continuation of U.S. patent application Ser. No. 13/934,072, filed Jul. 2, 2013, which is a continuation-in-part of and claims priority to International Patent Application No. PCT/PH2011/000015, filed Sep. 23, 2011, all of which are incorporated herein by reference in their entireties.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section. Additionally, any references discussed in this section are discussed only by way of background, and inclusion of such references in this section is not an admission that the references are actual prior art to the present application.

Power supply and/or conversion systems are generally configured to supply power to one or more types of loads, such as a power grid or one or more electrical devices (e.g., motors). Such systems may receive power from one or more power sources, such as batteries. The systems may convert the power into a form that can be used by the load, and transmit the converted power to the load for use by the load.

One method for increasing the efficiency of such systems is to utilize power obtained from electromagnetic fields to drive the load. U.S. Pat. No. 8,363,426 to Katargin et al. ("Katargin") discloses an apparatus for utilizing reactive power in electric power generating facilities. The reactive power is provided by a source of high-frequency, high-voltage electromagnetic oscillations. Inductive coils are placed in close proximity to the source of the electromagnetic radiation (SEMR), are loosely coupled with the SEMR, and are tuned to resonate at the same frequency as the SEMR. The coils do not have a ferromagnetic core. Energy emitted by the source of the electromagnetic oscillations is transferred to the inductive coils, and reactive current induced in the coils is collected from them and converted into standard AC voltage. The inductive coils are tuned to the SEMR and placed in close proximity to the SEMR, and the SEMR is a high-frequency, high-voltage source.

There is a need for a system for supplying power to a load that utilizes power obtained using electromagnetic induction and overcomes disadvantages associated with known systems.

SUMMARY

One embodiment of the disclosure relates to a system for providing power to a load. The system includes a first reactor including a first coil configured to generate a first magnetic field and at least one second coil configured to generate a plurality of second magnetic fields that vary an intensity of the first magnetic field. The system further comprises a second reactor comprising at least one second reactor coil configured to tune the first reactor to the load. The first reactor is configured to provide the power to the load, and the second reactor is configured to increase the power provided to the load by the first reactor by increasing an intensity of the plurality of second magnetic fields generated by the at least one second coil and tuning the first reactor to the load.

Another embodiment of the disclosure relates to another system for providing power to a load. The system includes a first plurality of coils. A first coil of the first plurality of coils is configured to generate a first magnetic field, and a plurality of second coils of the first plurality of coils are configured to generate a plurality of second magnetic fields that vary an intensity of the first magnetic field. The system further includes a second plurality of coils. The second plurality of coils are configured to tune at least one tuned coil of the first plurality of coils to the load. The first plurality of coils is configured to provide the power to the load, and the second plurality of coils is configured to increase the power provided to the load by the first plurality of coils by increasing an intensity of the plurality of second magnetic fields generated by the plurality of second coils and tuning the tuned coil to the load.

Yet another embodiment relates to another system for providing power to a load. The system includes a first reactor including a first coil configured to generate a first magnetic field and at least one second coil configured to generate a plurality of second magnetic fields that vary an intensity of the first magnetic field. The system further comprises a second reactor comprising at least one second reactor coil configured to tune the first reactor to the load. The system further includes a rectifier configured to receive AC output power at an output of at least one of the first reactor and the second reactor and convert the AC output power into DC output power. The system further includes an output inverter configured to synchronize the system with the load, wherein the output inverter is further configured to receive the DC output power, convert the DC output power into AC load power, and provide the AC load power to the load. The first reactor is configured to provide the power to the load, and the second reactor is configured to increase the power provided to the load by the first reactor by increasing an intensity of the plurality of second magnetic fields generated by the at least one second coil and tuning the first reactor to the load.

DETAILED DESCRIPTION

The present disclosure relates to systems and methods that may be used to provide power to a load using electromagnetic induction. A system according to some embodiments of the present disclosure may include at least two reactors. A main reactor may be configured to receive excitation power from an excitation source, such as a wind or solar source or one or more batteries, and to provide power to drive a load (e.g., a power grid, a motor, etc.). A resonating reactor may be connected to the main reactor and to the load and may be configured to resonate the main reactor with the load. The main reactor may include a regenerative coil configured to receive excitation current and to generate a magnetic field. The main reactor may also include two or more reactive coils configured to generate magnetic fields that vary the intensity (e.g., cause expansion and contraction) of the magnetic field generated by the regenerative coil. The main reactor may also include a collector coil that is magnetically coupled to the regenerative coil and configured to generate an opposing magnetic field. The resonating reactor may use the collector coil to automatically tune the main reactor (e.g., the regenerative coil) to the load. The resonating reactor may include two coils magnetically coupled to one another, one of which may be connected to one of the reactive coils of the main reactor and to the load, and the other of which may be shunted to the collector coil of the main reactor.

In some embodiments, the system may include an output inverter configured to synchronize the system with the load or grid and sink the output power to the load or grid (e.g., distribution and transmission network). The regulation of the system may be controlled by an output smart inverter. The smart inverter output power may be determined based on a maximum design capacity and/or parameters of the reactors. In some embodiments, the smart inverter may limit the power being transmitted to the grid in accordance with the program parameters. In some embodiments, the smart inverter can be programmed to operate at a frequency of 50 Hz and/or 60 Hz, or another frequency, and/or may adapt to the specific load requirement of the grid. In some embodiments, the smart inverter output may be limited by a maximum output capacity.

Some components of the two reactors may be physically wired to one another, and the system may be configured to operate with loads of any voltage and/or frequency (e.g., high or low voltage/frequency loads). In some embodiments, parameters of the system, such as maximum temperature of particular components, may be regulated by the system.

Figure 1:
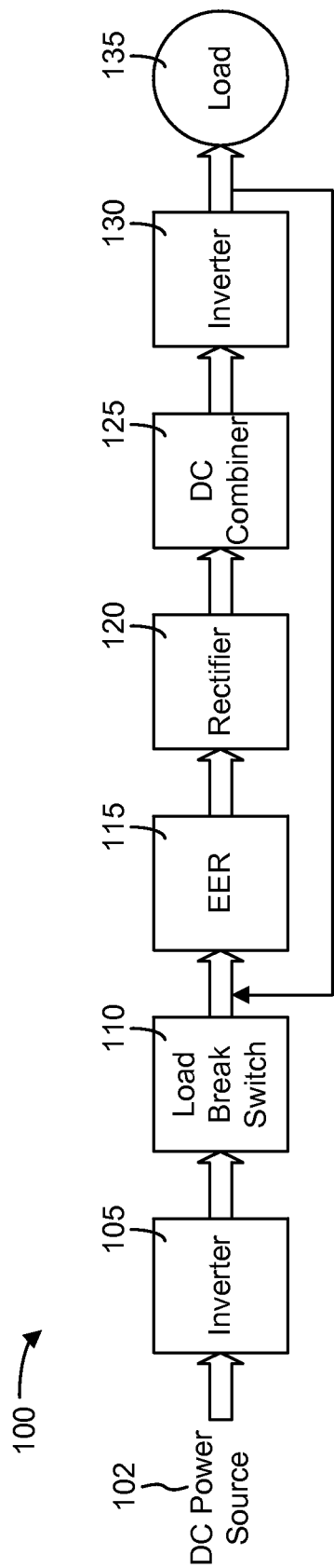
FIG. 1 is a block diagram of a system for supplying power to a load using a direct current (DC) power source according to an exemplary embodiment.

Referring now to FIG. 1, a block diagram of a system 100 for providing power to a load 135 is shown according to an exemplary embodiment. System 100 is configured to receive power from a direct current (DC) power source 102, such as one or more batteries, a solar panel, etc., and to utilize the power as excitation power for a reactor system 115. The received DC power may be transformed into alternating current (AC) power using an inverter 105. In some embodiments, inverter 105 has a pure sine wave output power and is grid compliant (e.g., operates at the same frequency with a power grid to which it is connected). In some embodiments, inverter 105 may be a smart type inverter and may generate/regulate voltage, frequency, and/or current with capability to synchronize with the grid. The AC input power may be received by a load break switch (LBS) 110 configured to allow the input power to be selectively connected and/or disconnected from reactor system 115. In some embodiments (e.g., when solar panels are used to provide excitation energy), LBS 110 may sense that output inverter 130 has already synchronized its power to the grid and may automatically sink the power of the excitation source to the output power of output inverter 130.

The AC input power is then provided to reactor system 115 and used as excitation current for a plurality of coils of reactor system 115. Reactor system 115 may be configured to harness electrical energy from electromagnetic fields generated by load 135 and/or other sources of electromagnetic radiation (e.g., ambient sources). Reactor system 115 may include a main reactor configured to receive the input power and generate a magnetic field using a first coil (e.g., a regenerative coil). Two or more other coils (e.g., reactive coils) of the main reactor may be configured to vary an intensity of the magnetic field generated by the first coil. Reactor system 115 may also include a resonating reactor that is configured to resonate the main reactor with load 135 (e.g., tune the main reactor to a resonant frequency that is approximately the same as a frequency of an electromagnetic field generated by load 135). The resonating reactor may also cause magnetic fields generated by the reactive coils to increase in intensity, causing the intensity of the varying magnetic field generated by the regenerative coil to increase in intensity. The variation in the magnetic fields may be related to a magnitude of the connected load 135. Reactor system 115 is described in further detail below, in one detailed embodiment, with respect to FIG. 3.

The output of reactor system 115 may be provided to a rectifier 120, which may convert the AC output of reactor system 115 into a DC output. The DC output may be received by a DC combiner terminal box 125 (e.g., to combine the output of several reactor systems). In some embodiments, DC combiner terminal box 125 may balance the voltage output of each reactor system connected in parallel, in the event of multiple parallel reactor systems, to be able to balance the load current drawn by each reactor system.

The output of box 125 may be provided to an output inverter 130. Output inverter 130 is configured to synchronize reactor system 115 to load 135. Output inverter 130 is further configured to convert the DC output power into AC power for use by the load, and to transmit the AC power to the load. In some embodiments, output inverter 130 may be configured to feed a portion of the AC output power back into reactor system 115 (e.g., to compensate for system losses and/or to ensure that magnetism in reactor system 115 can be maintained). In some embodiments, output inverter 130 may be a smart grid type of inverter that is configured to synchronize with a power grid. It may be composed of several modules connected in parallel (e.g., five modules). In some embodiments, one module may operate as a master module, and the other modules may operate as slave modules whose operating parameters are controlled by the master module. The master module may include a programmable load management software system that may automatically adjust the parameters of each individual slave module according to the demand of the load or transmission/distribution network. In some embodiments, output inverter 130 may be configured to generate its own voltage, current, and/or frequency source. Output inverter 130 may be capable of powering up a connected load on a stand-alone system or operate in synchronization with the grid. In some embodiments, it can operate in an off-grid mode and/or synchronize with other output inverters connected within the same network. In some embodiments, it can seamlessly switch between an on-grid mode and an off-grid mode without interruption. In some embodiments, it can maintain synchronization with other inverters in the system (e.g., during off-grid mode) and/or can be a source reference (e.g., of voltage and/or frequency) when the grid or network fails when in on-grid mode.

Figure 2:
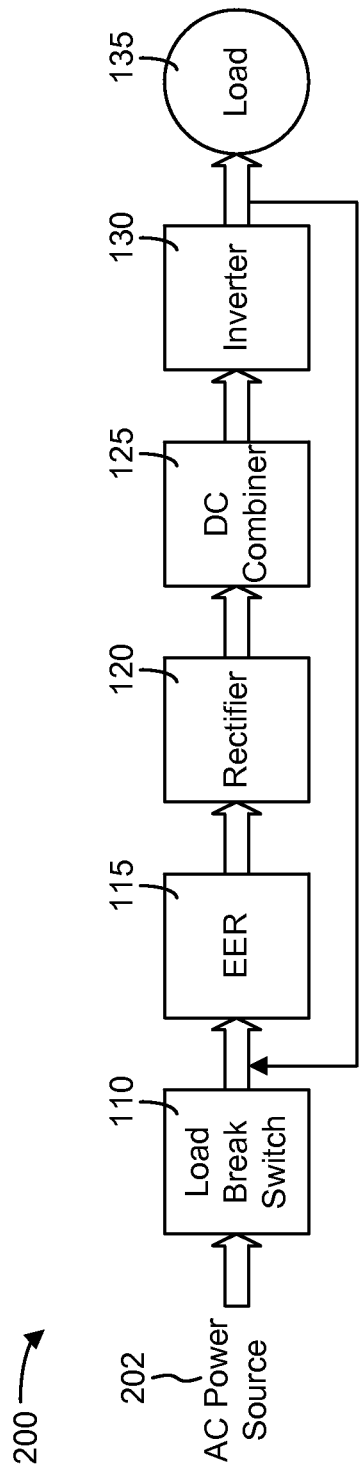
FIG. 2 is a block diagram of a system for supplying power to a load using an alternating current (AC) power source according to an exemplary embodiment.

Referring now to FIG. 2, a block diagram of a system 200 that may be used to provide power to load 135 is shown according to an exemplary embodiment. System 200 includes the same components as system 100, and like components in the two systems may function in a similar way. System 200 is configured to receive excitation energy from an AC source 202, rather than a DC source. Accordingly, the input power does not need to be inverted in order for it to be utilized by reactor system 115 in system 200.

Figure 3:
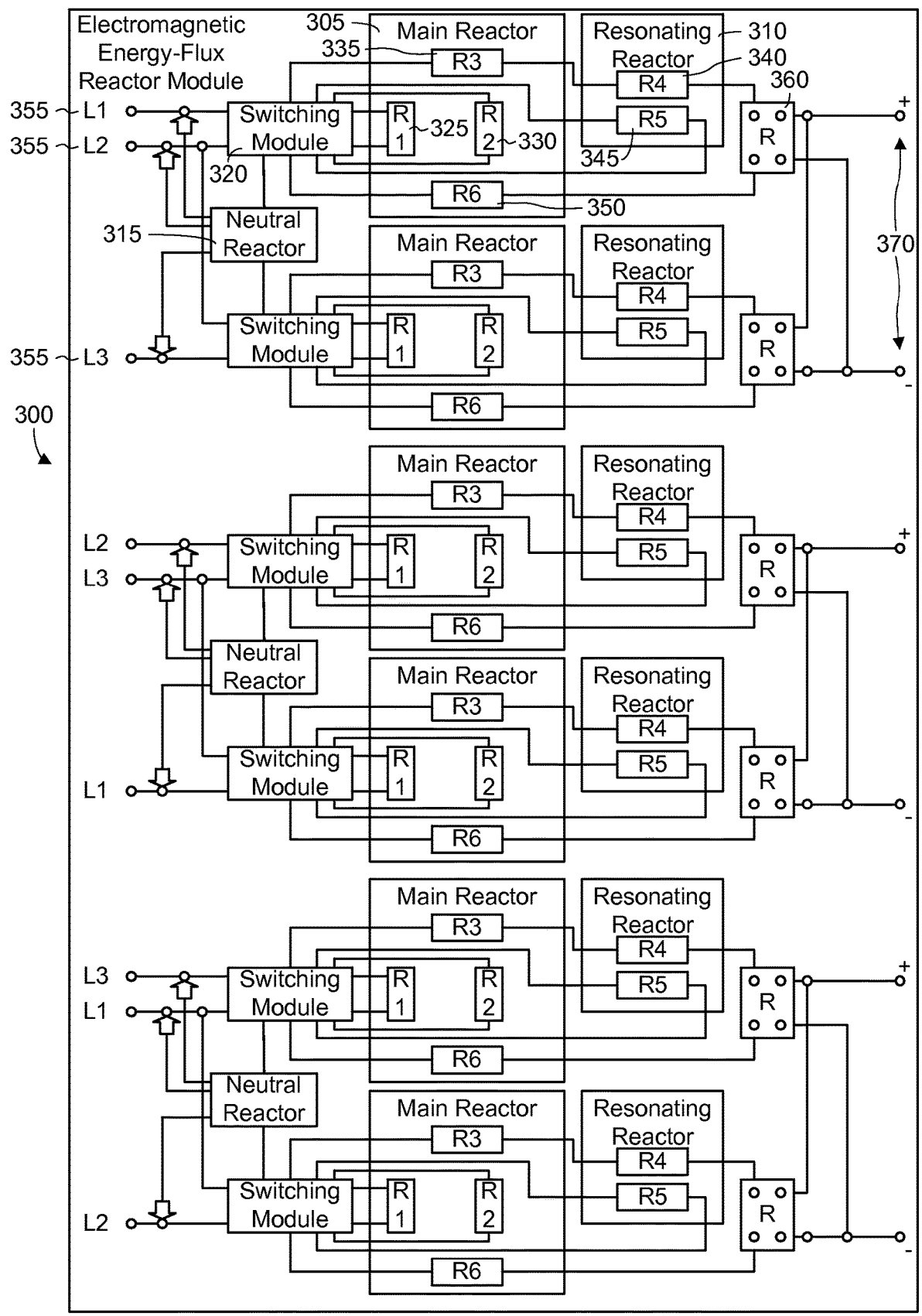
FIG. 3 is a circuit diagram of a reactor system that may be used in supplying power to a load according to an exemplary embodiment.

Referring now to FIG. 3, a circuit diagram of a reactor system 300 that may be used in supplying power to a load is shown according to an exemplary embodiment. Reactor system 300 may be an implementation of reactor system 115 shown in FIGS. 1 and 2 according to one exemplary embodiment. In the illustrated embodiment, three-phase AC excitation current is received via input power lines 355. Each set of input power lines 355 may be connected to two sets of reactor modules, including a main reactor 305 and a resonating reactor 310, through a switching module 320. Output AC power is provided to rectifiers 360, which transform the AC power into DC output power transmitted via output power lines 370. While reactor system 300 is shown as having six sets of reactor modules, for purposes of simplicity, the function of a single set of reactors modules will be described below.

Before the components of reactor system 300 are energized, various setup and programming of parameters of reactor system 300 and/or other components of the overall power supply system may be performed. For example, parameters used to allow an output inverter to synchronize to a power grid or other load and/or sink output power to the load may be set up. The output inverter may be programmed according to parameters associated with the grid or other load. For example, such parameters may include frequency range, voltage range, correct phase sequence of the grid with which the output inverter is to be synchronized, etc. In some embodiments, a protection system may be programmed (e.g., fault protection, over and/or under voltage protection, over and/or under frequency protection, maximum voltage and/or current of the inverter output, etc.). In some embodiments, a programmable load management system built within the system may manage operating parameters of each individual module within the inverter system (e.g., in the event of multiple modules).

Once the initial programming and setup has been completed, the load break switch may be activated and the components of reactor system 300 may be energized. Switching module 320 receives input power from input power lines 355. A neutral reactor 315 may also receive power from input power lines 355 and/or switching module 320. Neutral reactor 315 may be used to feed excess power back into input power lines 355 when it cannot be immediately used by the sets of reactor modules. A regenerative coil 325 of main reactor 305 is energized. Regenerative coil 325 is shunted between one of the terminals of a reactive coil 335 and a neutral point of neutral reactor 315. Reactive coil 335 is subsequently energized, which is connected to the excitation source (e.g., through regenerative coil 325) and to a first resonating reactor coil 340 of resonating reactor 310. Collector coil 330, which is shunted to a second resonating reactor coil 345 and magnetically coupled to regenerative coil 325, is also energized. First resonating reactor coil 340 is energized (e.g., through reactive coil 335). First resonating reactor coil 340 is connected in series with reactive coil 335 and is connected directly to one of the terminals of a rectifier 360. Second resonating reactor coil 345, which is shunted to collector coil 330 and magnetically coupled to first resonating reactor coil 340, is energized. Reactive coil 350, which is magnetically coupled to regenerative coil 325 and is directly connected to a terminal of a rectifier 360, is also energized. Reactive coil 330 is also magnetically coupled to regenerative coil 325.

The output inverter may be programmed similarly to the excitation inverter and activated to synchronize with, and feed power to, the power grid or other load. After the output inverter is activated to synchronize with the grid, a current flow of a specific magnitude will flow through the components of system 300. The magnitude of the current may be proportional to the magnitude of the connected load. Current flow through regenerative coil 325 causes regenerative coil 325 to generate a first magnetic field. Current flowing through reactive coil 335 causes reactive coil 335 to generate a second magnetic field that is configured to vary the intensity of the first magnetic field generated by regenerative coil 325 based on the output load of the inverter in a manner that expands (e.g., increases the intensity of) the magnetic field generated by regenerative coil 325. Current flowing through reactive coil 350 causes reactive coil 350 to generate a third magnetic field that is configured to vary the intensity of the first magnetic field generated by regenerative coil 325 based on the output load of the inverter in a manner that collapses (e.g., reduces the intensity of) the magnetic field generated by regenerative coil 325.

The current flowing in reactive coil 335 with configured polarity and coil winding direction with reference to regenerative coil 325 produces a boosting magnetic field to the magnetic field generated by regenerative coil 325. The current flowing on reactive coil 350 with configured polarity and coil winding direction with reference to regenerative coil 325 produces a bucking magnetic field to the magnetic field generated by regenerative coil 325. The effect of the boosting and bucking magnetic fields in regenerative coil 325 simulates the expansion and contraction of the magnetic field in the stator winding of a generator when the rotor is being rotated with a DC excitation (producing north and south magnetic poles on the rotor). As the output load of the inverter increases, the current and voltage produced by resonating reactor coil 345 (e.g., on a one to one ratio with the current drawn by the load or slightly higher) is being induced in resonance with collector coil 330 magnetically coupled to regenerative coil 325. This energy induced by resonating reactor coil 345 maintains and tunes the magnetic field intensity of regenerative coil 325 to any given specific load.

A current flow on first resonant reactor coil 340 produces a fourth magnetic field that induces a current in second resonant reactor coil 345, which is magnetically coupled to first resonant reactor coil 340. In some embodiments, first resonant reactor coil 340 and second resonant reactor coil 345 may be designed to be substantially the same (e.g., same materials, same number of turns, etc.). The voltage drop across second resonant reactor coil 345 may be slightly higher than the initial voltage drop across regenerative coil 325 due to the initial excitation from the excitation source, and a current flow substantially equivalent in magnitude with a current flowing through reactive coils 335 and 350 may flow through collector coil 330, which may generate another magnetic field and induce a current in regenerative coil 325, which is magnetically coupled to collector coil 330. As a result, resonating reactor 310 may take over as the source of excitation, or supplement the excitation source, and may resonate main reactor 305 with the load connected to the system.

In some embodiments, regenerative coil 325 may collect more current (e.g., via induction from resonating reactor 310) than can be collected by reactive coil 335 and delivered to rectifier 360 for transmission to the load. In some such embodiments, regenerative coil 325 may transmit excess energy back to a neutral reactor 315. Neutral reactor 315 may route the energy back into input power lines 315 (e.g., in a feedback loop), preventing the energy from being lost as waste energy. In some embodiments, neutral reactor 315 may be a zigzag type three phase transformer designed according to the specific voltage of the excitation source (e.g., equal to the voltage output by the output inverter) and excess projected current generated by regenerative coil 325. Excess current on regenerative coil 325 may flow through its neutral point to the neutral point of neutral reactor 315. The current flowing from the neutral point of neutral reactor 315 may be induced to the three phase excitation source via the three phase zigzag winding of neutral reactor 315. In some embodiments, to help ensure that magnetism in main reactor 305 and/or resonating reactor 310 is maintained and/or to compensate for system losses, a feedback circuit from the output inverter may be used to supply a portion of the output power back into the excitation input.

Figure 4:
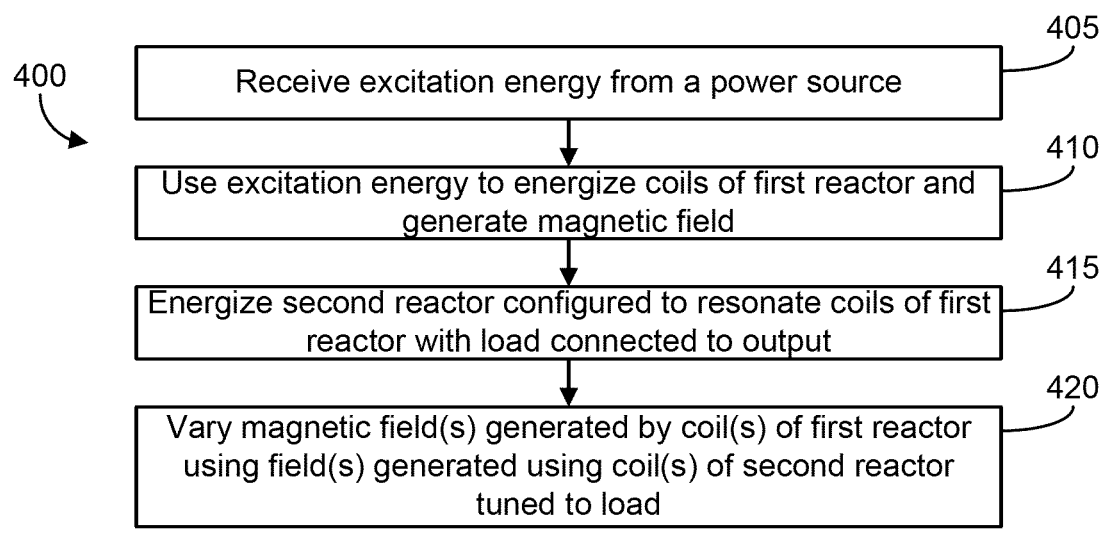
FIG. 4 is a flow diagram of a method of supplying power to a load using a reactor system according to an exemplary embodiment.

Referring now to FIG. 4, a flow diagram of a process 400 of providing power to a load (e.g., using a system such as systems 100, 200, and/or 300) is shown according to an exemplary embodiment. A reactor system may receive excitation energy from a power source (405). The excitation energy may be used to energize one or more coils of a first reactor to generate a first magnetic field (410). In some embodiments, the first reactor may include coils configured to vary (e.g., expand and/or collapse) the magnetic field. A second reactor may be energized and may be configured to resonate the coils of the first reactor with a load connected to the output of the second reactor (415). In some embodiments, the second reactor may be configured to vary (e.g., increase the intensity of) the magnetic field generated by the first reactor (420), for example, by changing the intensity of the fields generated by the coils of the first reactor that expand and/or collapse the magnetic field generated by the first reactor.

Some embodiments of the present disclosure, illustrated, for example, in FIGS. 5-12, relate to a regenerative electromagnetic energy-flux reactor (EER) of high energy efficiency output. Such embodiments may utilize an alternating current source as excitation to create electromagnetic interaction into the reactor assembly, which may be used to regenerate electromagnetic energy induced by a reactive coil to one or more regenerative coils and may be tuned by an electrical load directly connected to the output of one or more collector coils. Maximum loading of the collector coils may be determined with reference to the ratio of reactive to regenerative coils. The collector coils can be automatically tuned by a separate and distinct reactive reactor coil assembly (e.g., a resonating reactor) (connected to an output of the reactive coils of the main assembly) for stable performance and maximum energy regeneration at the regenerative coils.

In some embodiments, the EER may be an assembly of one or more microprocessor-based power module (MPM), a single stage, two stage, or more than two stage reactor system (RS) comprising of three (3) or more coils, a microprocessor-based control board (MCB) and one or more Hall Effect current sensors (HECS). For example, the system may be arranged into a cascading system where the output of the first EER may serve as an excitation source of the second larger EER. For example, a 100 kW EER may serve as an excitation source for a 1 MW EER. Once both EERs are running, they can be synchronized to the grid to produce an aggregate sum of 1.1 MW output. The increased efficiency of the output may be governed by the electrical load that is connected to the reactive coil assembly coupled directly or via a compensating reactor which regulates the voltage output of the EER. The EMF and current that flows on the reactive coils induces electromagnetic energy on the regenerative coil that produces magnetic fields on the reactor core opposite to the magnetic fields developed by the regenerative coil itself (when excited by an excitation source). The opposing magnetic fields in the regenerative circuits exert pressure on the atoms in the system to be in coherent state with one another. The coherent state of the atoms results in a continuous exchange of electron flow between atoms by way of magnetic induction in the reactor system. Since electrons can hardly flow in the atmosphere due to high resistance of different kind of gases, they will be attracted to flow on the surface of conductors of less resistance. According to some embodiments, in the EER, the conductors of least resistance may be the regenerative and reactive coils, causing electrons to be attracted to these conductors. As the electrical loads on the reactive circuits (e.g., reactive coils) are increased, the magnitude of the electromagnetic energy in the regenerative circuits (e.g., regenerative coils) increases proportionally and the efficiency of the output delivered to electrical loads also increases. A resultant increase in the electrical load capacity of the collector coil is also attained. The collector coils may be loaded separately but may be tuned according to a transformation ratio of reactive and regenerative coils. The collector coils can be also excited by a distinct reactive (e.g., resonating) reactor independent of the main reactor and connected to one of the output reactive coils of the main reactor assembly for auto tuning. The HECS monitors the operating parameters of the resonating reactor and activates and deactivates the system when it is within or beyond preset operating parameters. During the deactivation process, the system will shift automatically to a bypass mode. In bypass mode, the reactor may be shut down due to overloading and a bypass circuit may be connected to connect the load directly to an alternative source. When the HECS identifies that the load is within normal parameters of the reactor, bypass mode may be cancelled. A maximum loading capacity of the reactive, regenerative and collector circuit may be limited by a design ratio and current rating of the conductor coils. To maximize design output ratio efficiency, a second stage reactor may be integrated to regulate the desired voltage output for the electrical load. In some embodiments, a minimum of two reactive coils maybe used to provide high intensity electromagnetic energy induction to the regenerative coils. The magnetic core of the EER may be made of thin film materials. The reactor system magnetic core may be made of high grade silicon steel sheets in a grain oriented configuration. The thickness of the plate of the grain oriented silicon steel sheets may be of the thinnest available production size for better performance and efficiency. The stacking depth of the core area may be of the maximum depth, based on design calculation, to maximize the Casimir effect on the silicon laminated thin sheets. The copper conductor may be 99.99% oxygen free and wound on a core to create the reactive, regenerative, and collector coils. The reactive, regenerative, and collector coils may be wound separately from each other or together on same legs of each reactor core. The reactive, regenerative, and collector coils may be constructed of rectangular or round cross section copper magnet wire, which may be 99.9% oxygen free. The MPM and the MCM may be able to withstand a temperature rise of 65 degrees C. The construction of the reactor core may be of a two-legged R-type core or three-legged R-type core.

Figure 5:
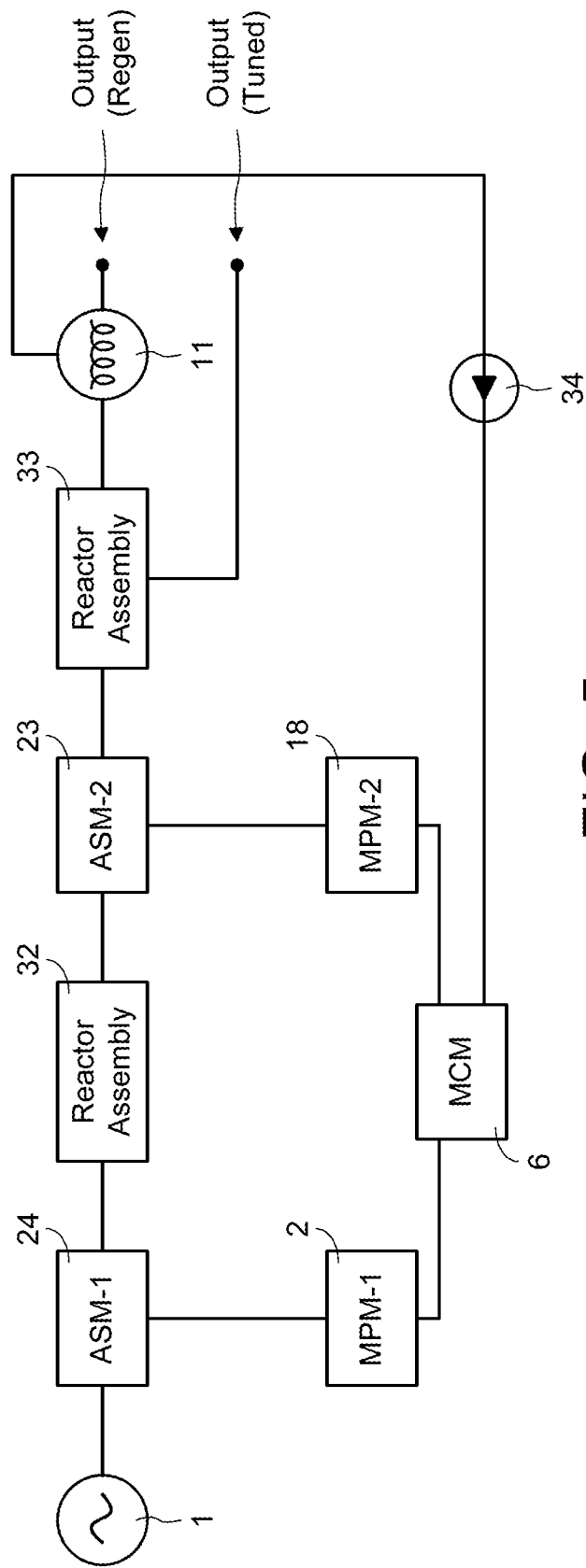
FIG. 5 is a block diagram of another system for supplying power to a load according to another exemplary embodiment.
Figure 9:
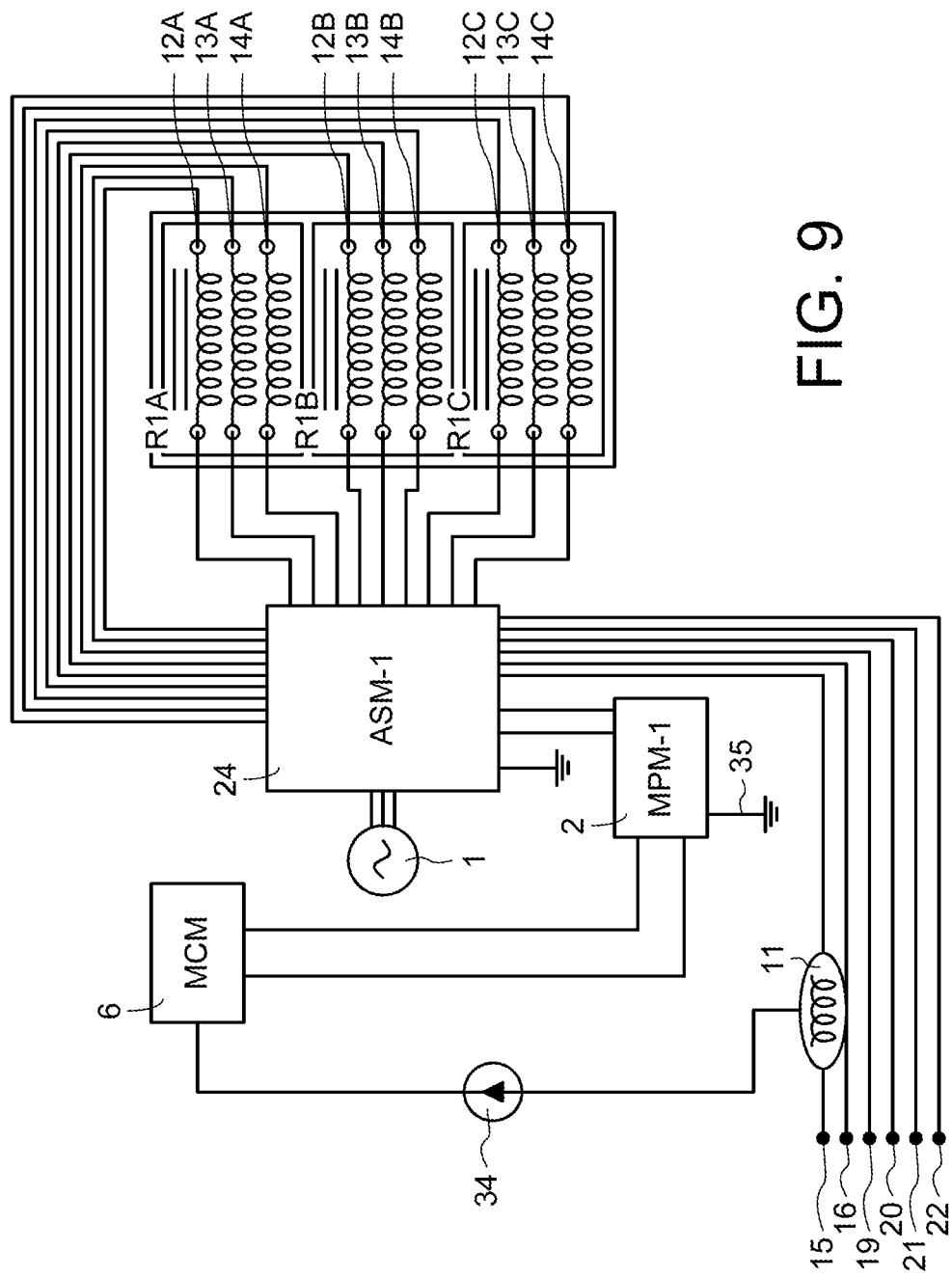
FIG. 9 is a circuit diagram of a single stage of a three phase, two stage reactor assembly according to an exemplary embodiment.

Referring now to FIG. 5, a block diagram of another system for supplying power to a load is shown according to an exemplary embodiment. The system of FIG. 5 includes an exciter source 1, which excites the reactors 32 and 33 that serve as the source of power for the microprocessor-based power modules (MPMs) 2 and 18, microprocessor-based control module (MCM) 6, and at bypass mode. The microprocessor-based power modules 2 and 18 drive the control circuit of the auxiliary switching module 24 and 23 as shown in FIG. 9. These microprocessor-based power modules 2 and 18 are controlled and actuated by the microprocessor-based control module 6 based on a signal received from the Hall Effect current sensor 11. In the embodiment shown in FIG. 6, the exciter source 1 supplies the power requirement of the microprocessor-based power modules 2 and 18 and the microprocessor-based control module 6.

Figure 6:
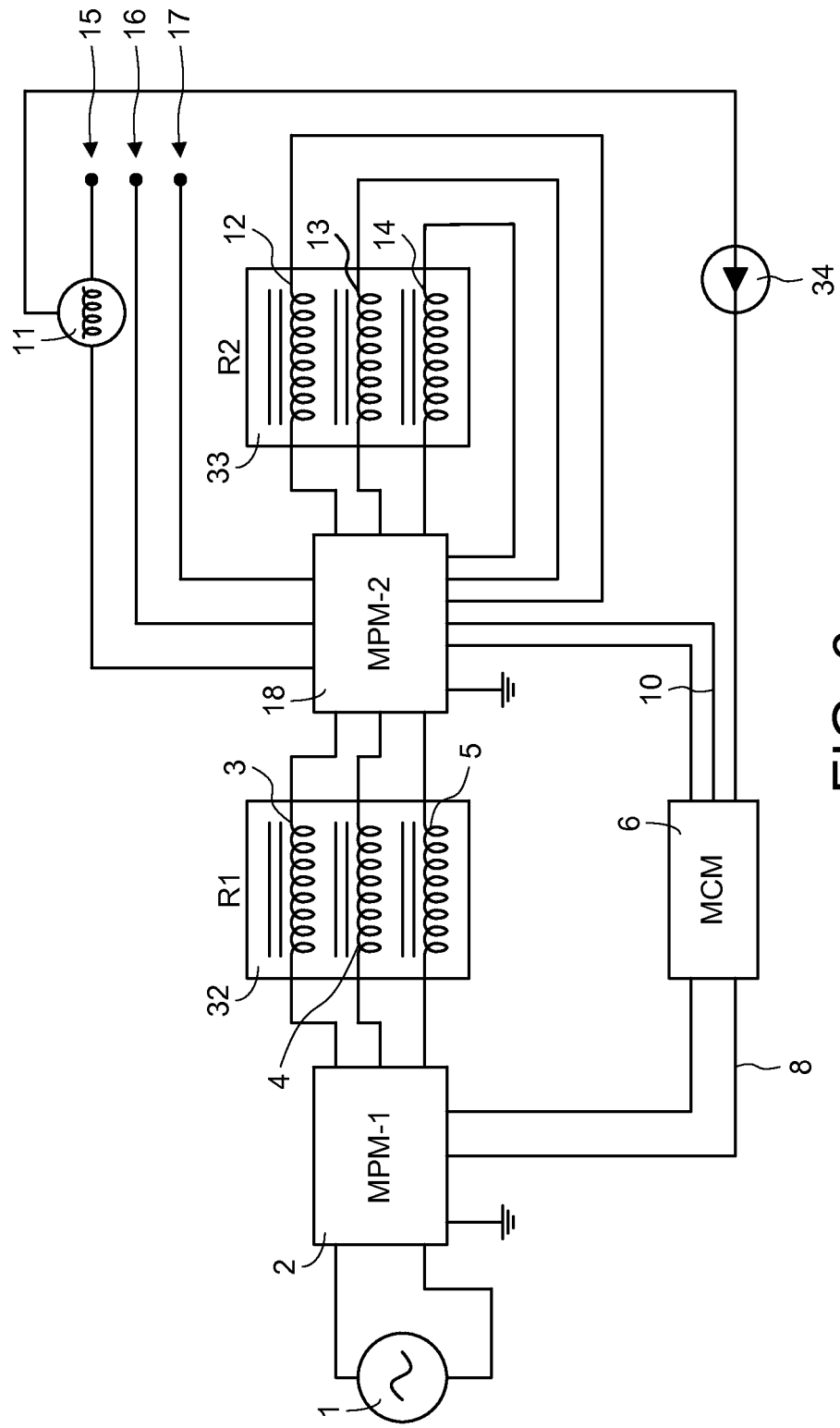
FIG. 6 is a circuit diagram of a single phase, two stage reactor assembly according to an exemplary embodiment.
Figure 7:
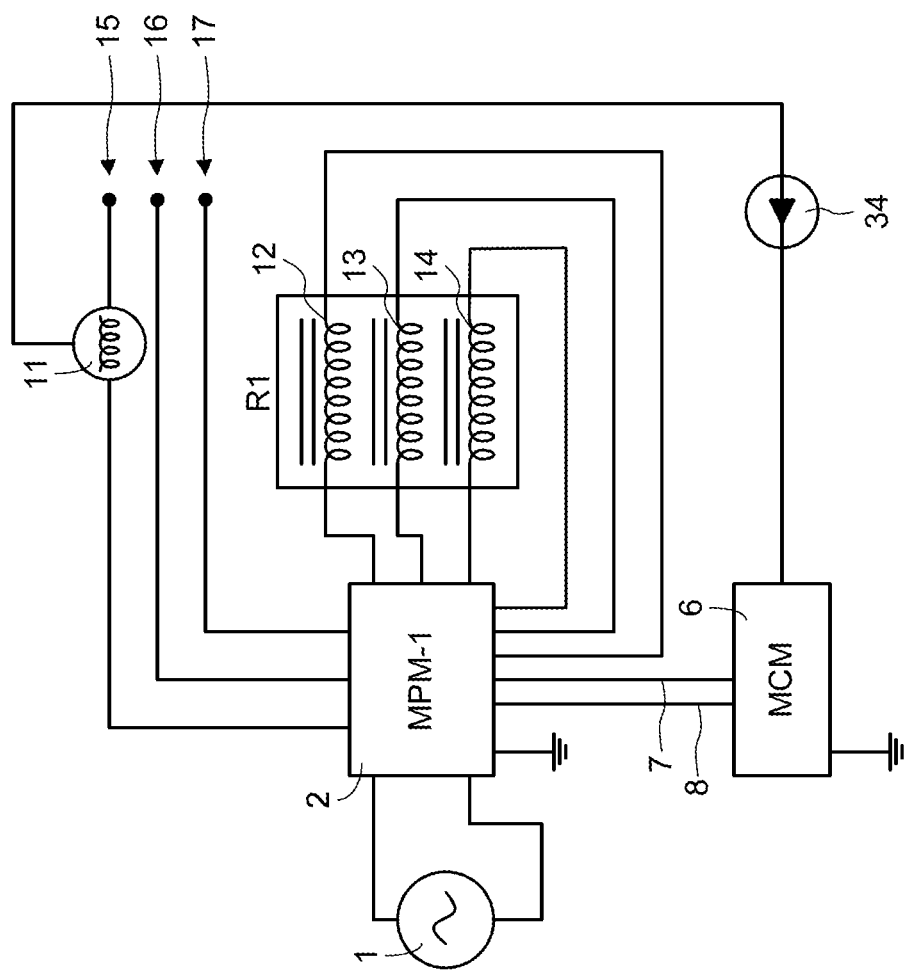
FIG. 7 is a circuit diagram of a single stage of the single phase, two stage reactor assembly shown in FIG. 6 according to an exemplary embodiment.

At zero electrical load at terminal 15, the Hall Effect current sensor 11 senses zero current and sends a signal to the microprocessor-based control module 6. The microprocessor-based control module 6 will process the signal and actuate, relaying the processed signal to microprocessor-based power modules 2 and 18 via control cables 8 and 10, as shown in FIG. 6. The microprocessor-based power modules 2 and 18 will deactivate the reactors 32 and 33.

Figure 8:
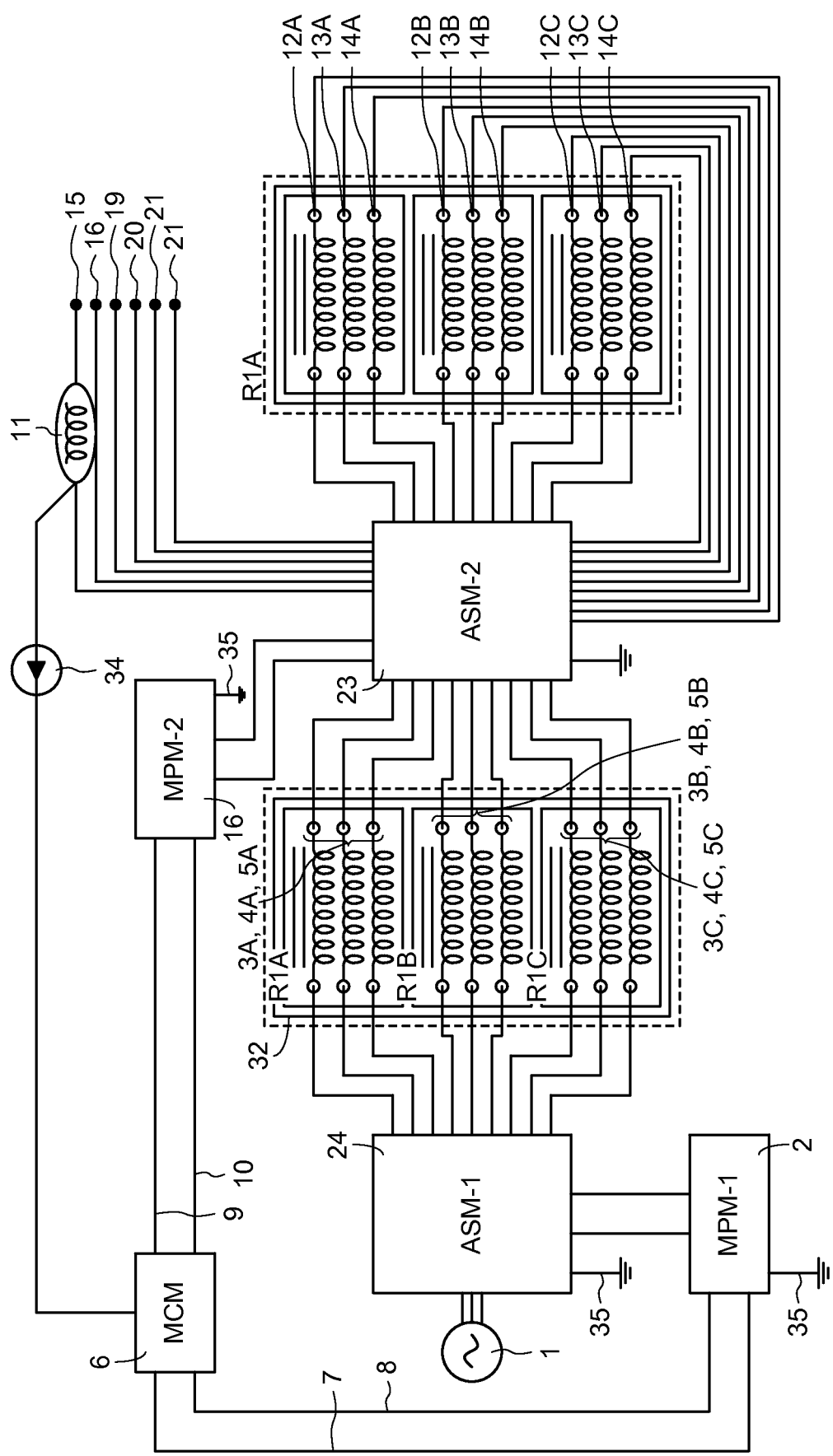
FIG. 8 is a circuit diagram of a single phase, single stage reactor assembly according to an exemplary embodiment.

In the embodiment shown in FIG. 8, the exciter source 1 supplies power to the microprocessor-based power modules 2 and 18 and the microprocessor-based control module 6. At zero electrical load at the terminals 15, 16, and 19, the Hall Effect current sensor 11 senses zero current and sends a signal to the microprocessor-based control module 6. The microprocessor-based control module 6 will process the signal and actuate, relaying the process signal to the microprocessor-based power modules 2 and 18. The microprocessor-based power modules 2 and 18 will process the receive signals and activate the auxiliary switching modules 24 and 23. The auxiliary switching modules 24 and 23 will deactivate reactors 32 and 33.

Upon switching a load on terminal 15 (in FIG. 6) and/or terminals 15, 16 and 19 (in FIG. 8), the Hall Effect current sensor 11 will send the signal 34 to the microprocessor-based control module 6. The microprocessor-based control module 6 will receive and process the signal 34 sent by Hall Effect current sensor 11. If the signal 34 sent by the Hall Effect current sensor 11 is equal or above the preset minimum current triggering signal, the microprocessor-based control module 6 will relay the processed signal to the microprocessor-based power modules 2 and 18. In the embodiment shown in FIG. 6, the microprocessor-based power modules 2 and 18 will activate reactors 32 and 33. In the embodiment shown in FIG. 8, the microprocessor-based power modules 2 and 18 will relay the processed signal to the auxiliary switching modules 24 and 23. The auxiliary switching modules 24 and 23 will deactivate the bypass mode and at the same time activate reactors 32 and 33.

When reactors 32 and 33 are energized, an electromagnetic energy and magnetic fields of opposite direction and an exciting current 27 (see FIG. 10) that creates the counter opposing fields 28 are developed at the regenerative coil 4 (as in FIG. 6) or regenerative coils 4A, 4B, and 4C (as in FIG. 8). Almost at the same time, a current flow at the reactive coil 3 (as in FIG. 6) or the reactive coils 3A, 3B, and 3C (as in FIG. 8) develops a feedback current 29 and a counter opposing magnetic field 30 (as shown in FIG. 10) to the regenerative coil 4 (as in FIG. 6) or regenerative coils 4A, 4B, and 4C (as in FIG. 8) directly in opposition to the magnetic field 28.

Figure 10:
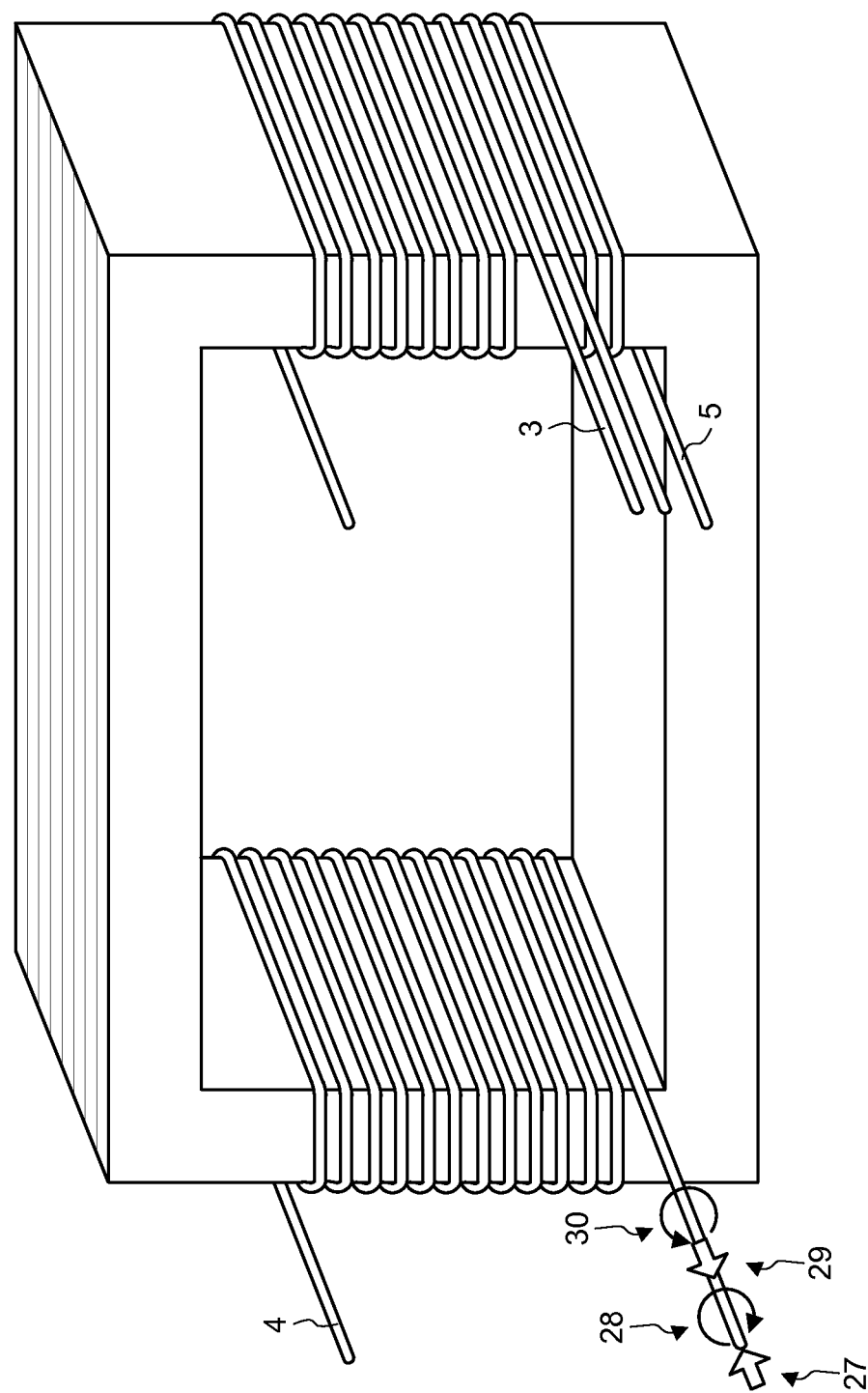
FIG. 10 is an illustration of a reactor assembly with coils wound around a two-legged R-type core according to an exemplary embodiment.
Figure 11:
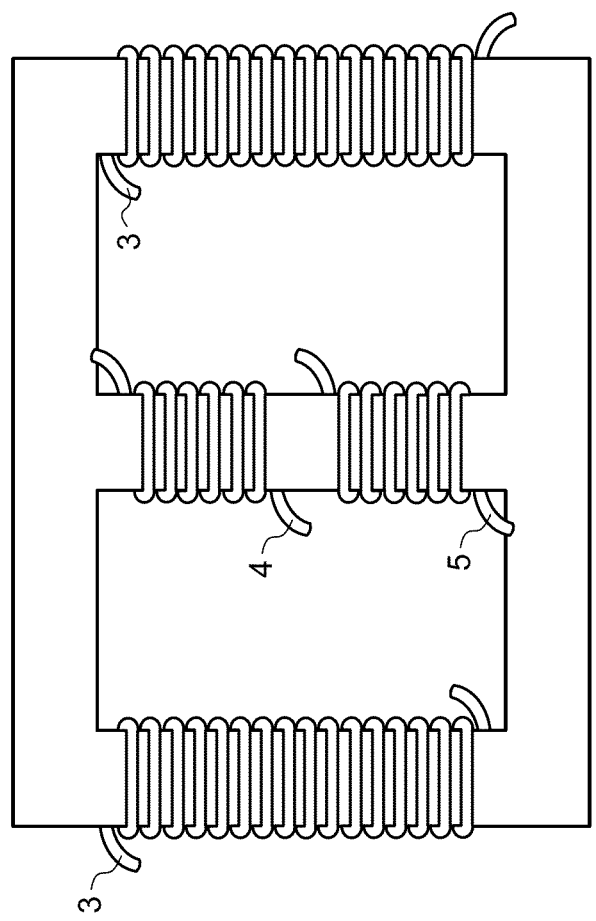
FIG. 11 is an illustration of a reactor assembly with coils wound around a three-legged R-type core according to an exemplary embodiment.
Figure 12:
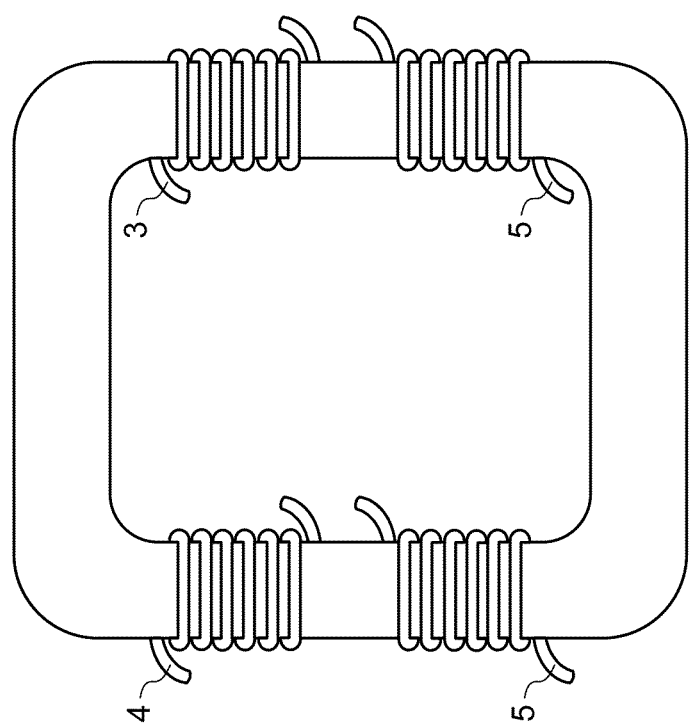
FIG. 12 is an illustration of a reactor assembly with coils wound around a toroidal core according to an exemplary embodiment.

Both the exciting current 27 and feedback current 29 (as shown in FIG. 10) in the embodiments shown in FIG. 6 and FIG. 8 are in collision, thus pressuring the atoms in the system to be cohesive with one another. The cohesion state of the atoms gives rise to the exchange of electrons between atoms resulting in the continuous flow of electrons in the regenerative coils and dissipated to the electrical loads. Since electrons can hardly flow in space due to the high resistance of the gases in the atmosphere, they are attracted to a path of less resistance. In the exemplary EER shown in FIGS. 5-10, the reactive coil 3 and the regenerative coil 4 (as in FIG. 6), and the reactive coils 3A, 3B, and 3C and the regenerative coils 4A, 4B, and 4C (as in FIG. 8), are the electrical path of less resistance, and electrons will be attracted to their conductor coils. As long as the exciter source 1 continuously supplies the needed excitation voltage and current, the cohesion of atoms through magnetic induction will continue. The collector coil 5 (as in FIG. 6) or collector coils 5A, 5B. and 5C (as in FIG. 8) will be electrically loaded to increase the intensity of the counter opposing magnetic fields 28 in the regenerative coil 4 (as in FIG. 6) or regenerative coils 4A, 4B, and 4C (as in FIG. 8) and current flow in the reactive coil 3 (as in FIG. 6) or reactive coils 3A, 3B, and 3C (as in FIG. 8). This is to maintain or increase the atom cohesive strength developed in the reactor system. When the magnetic field is being expanded/boosted, the atom may be expanded, and it may need to attract electrons in the near fields to fill to fill up the holes, thereby converting this atom to a base state (receiving electrons). When the magnetic field is being contracted/bucked, then the atom contracts, and this forces the atom to shell out an electron, thereby converting this atom into a transit state (transmitting electrons). The rate of transfer of electrons from one atom to another may be termed atom cohesive strength. Once there is a flow of electrons, the varying (boosting/bucking) magnetic field of a certain magnitude in relation to the load may need to be maintained.

The microprocessor-based power module 18 controls and adjusts the ratio of reactor 33 with respect to regenerative coils 12 with 13 (as in FIG. 6) and regenerative coils 12A, 12B, 12C and 13A, 13B, 13C (as in FIG. 9) via the auxiliary switching module 23, to regulate the voltage output at terminals 15, 16 and 17 (as in FIG. 6) and 15, 16, 19, 20, 21 and 22 (as in FIG. 9). In some embodiments, this may be a multi-tap design, and the module can be programmed to adjust the tapping once it senses that the voltage is beyond or below the preset value. In some embodiments, the output inverter may regulate the voltage output. The single phase outputs for the embodiment shown in FIG. 6 line to line are terminals 15 and 16, line to ground are terminals 15 and 35, 16 and 35 and 17 and 35. The three phased output terminals for the embodiment shown in FIG. 9 are 15, 16, 19 and 20, 21, and 22, respectively. The collector coil 14 (as in FIG. 6) or collector coils 14A, 14B, and 14C (as in FIG. 9) are utilized to maximize the output load of the reactor system. Two loads may be connected on the system (e.g., primary and secondary loads). The primary loads may be connected directly to the output of reactive coils, and the secondary loads may be connected directly to collector coils. The primary loads may be configured to produce contracting magnetic fields on the regenerative coils, and the loads on the collector coils may be configured to produce boosting magnetic fields on the regenerative coils. A separate and distinct reactive reactor coil assembly can be introduced to excite the collector coils for self tuning instead of loading it with electrical loads. This reactive reactor coil assembly is connected at one of the output of the main reactor reactive coil.

In some embodiments, an assembly of an EER may include an external exciter input source (e.g., utility grid, power plants such as hydroelectric, thermal, nuclear and geothermal, wind generator, fuel cell generator, solar power generation and tidal power generation). The assembly may further include one or more auxiliary switching modules that deactivate and activate the reactor(s). The system may be a single stage or double stage system and/or may be a single phase or three phase system. The assembly may further include a microprocessor-based power module that controls the auxiliary switching module and a microprocessor-based control module that process the signal feed by Hall Effect current sensors. The assembly may include the Hall Effect current sensors that sense the output current of the output electrical load of the system. The assembly may further include a system of one or more electromagnetic reactors (e.g., single or two stage) and may include the following coils: (1) a reactive inductive coil for receiving electrical energy and inducing an opposing magnetic field at a regenerative coil; (2) a regenerative inductive coil that absorbs the electromagnetic energy and magnetic fields induced by the reactive coil and produces magnetic fields opposing the direction of the magnetic fields induced by the reactive coil when excited by an external source; (3) a collector inductive coil configured to increase an intensity of a magnetic field generated by the regenerative coil when loaded separately by an electrical load tuned to the ratio of reactive and regenerative coils and/or to be excited by a separate and distinct reactive/resonating reactor (connected to an output of a main reactor reactive coil) for auto tuning of the main reactor without the benefit of an external electrical load connected to the collector coil; (4) an independent reactive inductive reactor assembly which induces excitation current and voltage to the collector coil of the main reactor for increased magnetic fields at the regenerative coil of the main reactor and/or for auto tuning of the main reactor assembly; and/or (5) a compensating reactor to regulate the voltage output of the system.

In some embodiments, the microprocessor-based control module receives the signal from the Hall Effect current sensors, processes the signal, activates the microprocessor-based power module, and relays the processed signal to deactivate or activate the reactor system (e.g., in the embodiment of FIG. 6), or control the operation of the auxiliary switching module to deactivate or activate the reactor systems based on the signal from the Hall Effect current sensors as processed by the microprocessor-based control module and relay the processed signal to microprocessor-based power module (e.g., in the embodiment of FIG. 9).

In some embodiments, the EER may be configured to deactivate the reactor system once the level of current sensed by the Hall Effect current sensor at the output or load side falls below the level of the preset minimum current signal. The EER may be configured to activate the reactor system once the Hall Effect current sensor senses a current above a minimum preset current signal and less than or equal to a maximum preset current signal. In some embodiments, the EER may be configured to deactivate the reactor system once the Hall Effect current sensors sense a current signal over the preset maximum current level signal and/or switch the system into a bypass mode.

In some embodiments, the EER may produce two opposing magnetic fields at the regenerative circuits/coils when loaded at the output terminals of the reactive and/or collector coils and/or when the collector coil is excited by a separate distinct reactive reactor assembly for self tuning, resulting in an increased intensity of opposing magnetic fields and the collision of current, forcing the atoms in the system to be in cohesion. The cohesion process enables the exchange of electrons between atoms resulting in the continuous flow of electrons through the reactive and regenerative coils that may be absorbed by the connected electrical loads as long as the regenerative coils are excited.

In some embodiments, the EER may include only a single reactor assembly. In some such embodiments, the output and the collector coil may be loaded independently.

In some embodiments, the EER may utilize electromagnetic induction to regenerate sizable energy magnitude at the regenerative coils using induced EMF and current in the reactive coils resulting from the increased intensity of the magnetic fields at the regenerative circuits from the tuned load of the collector coils. The magnitude of regenerated energy at the regenerative coils may be based on a ratio of reactive to regenerative and/or regenerative to reactive coils (e.g., turns ratio).

In some embodiments, the EER may utilize electromagnetic induction theory to regenerate sizeable energy magnitude at the regenerative coils by means of induced EMF and current in the reactive coils and the excitation of the collector coils by a separate and distinct reactive/resonating reactor assembly (connected to one of the outputs of the reactive circuits). The excitation energy of the separate and distinct reactor assembly increases the intensity of the opposing magnetic fields induced by the reactive coils of the main reactor at the regenerative circuits. The reactive/resonating reactor assembly may be configured to automatically tune the main reactor assembly to a load connected to the reactive/resonating reactor assembly. The magnitude of regenerated energy at the regenerative coils may be based on a ratio of reactive to regenerative and/or regenerative to reactive coils (e.g., turns ratio).

In some embodiments, the EER may regenerate energy of sizable magnitude according to a ratio of reactive to regenerative coils and/or regenerative to collector coils when an alternating current source is installed and excites the EER with energy. In some embodiments, the energy may be delivered to AC load banks (e.g., resistive or inductive AC load and/or a rectifier assembly to convert to DC).

In some embodiments, the EER may receive excitation energy from a DC source through an inverter. The DC source may include renewable energy sources like wind, solar, fuel cell, and/or other forms of DC sources (e.g., batteries/battery banks). In some embodiments, the EER may be configured to output energy in an AC waveform to AC load banks (e.g., resistive or inductive AC load and/or a rectifier assembly to convert to DC). The EER may regenerate energy of sizable magnitude. In some embodiments, the regenerated energy may be based on a ratio of reactive to regenerative and regenerative to collector coils.

In some embodiments, aspects of the EER may operate according to the following exemplary formulas:

$$P(in) = P(out) + P(sys) - P(reg)$$

$$P(reg) = P(rea) + P(rea-sr)$$

$$P(rea) = \left(\frac{N(rea)}{N(reg)}\right)(V(rea))(I(L))(p.f.)$$

$$P(rea-sr) = \left(\frac{N(col)}{N(rea-sr)}\right)(V(rea-sr)(I(L))(p.f.)$$

$$P(in) = P(out) + P(sys) - \left\{\left[\left(\frac{N(rea)}{N(reg)}\right)(V(rea))(I(L))(p.f.)\right] + \left[\left(\frac{N(col)}{N(rea-sr)}\right)(V(rea-sr))(I(L))(p.f.)\right]\right\}$$

P(in)—Power input to the EER
P(out)—Power output dissipated to the electrical loads
P(reg)—Power regenerated to the regenerative circuits
P(rea)—Power induced by the reactive circuits to the regenerative circuits
P(rea-sr)—Power dissipated by the separate and distinct reactor as excitation of the collector coils of the main assembly
P(sys)—Power dissipated by system losses
N(rea)—Number of turns of reactive coil
N(reg)—Number of turns of regenerative coils
N(col)—Number of turns of collector coils
N(rea-sr)—Number of turns of separate reactive reactor
I(L)—Load current of the connected load of the EER
p.f.—power factor of the connected load of the EER
V(rea)—Voltage drop at the reactive coil
V(rea-sr)—Voltage drop at separate reactive reactor reactive coils
Note: the volts per turn of the main reactor and the separate and distinct reactive reactor assembly may be the same.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and/or program products on any machine-readable media for accomplishing its operations. The embodiments of the present disclosure may be implemented using an existing computer processor, or by a special purpose computer processor incorporated for this or another purpose or by a hardwired system. Any type of processor may be used (e.g., FPGA, ASIC, ASIP, CPLD, SDS, etc.). No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure may include program products including machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-readable storage media include non-transitory media do not include purely transitory media (i.e., signals in space). Machine-executable instructions comprise, for example, instructions and data which cause a general purpose computer, special purpose computer, or special purpose processing machine to perform a certain function or group of functions.

It should be noted that although the flowcharts provided herein show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system to provide power to a load, the system comprising:
  a first set of coils configured to provide power to a load, the first set of coils comprising:
    a first coil configured to receive an input power source and generate a first magnetic field;
    a second coil configured to generate a second magnetic field, the second magnetic field varying an intensity of the first magnetic field with time; and
    a third coil configured to generate a third magnetic field, the third magnetic field in opposition to the first magnetic field; and
  a second set of coils configured to vary the power of the first set of coils by tuning the first set of coils to the load, the second set of coils comprising:

a fourth coil shunted to the load and the second coil, the fourth coil tuning the first set of coils by coupling the load to the second coil to reduce harmonic distortion of the first magnetic field; and a fifth coil magnetically coupled to the fourth coil and shunted to the third coil, the fifth coil configured to vary an intensity of the third magnetic field.

2. The system of claim 1, the system further comprising an input inverter configured to receive power from a DC power source and convert the power into AC power for use as an excitation energy for at least one of the first set of coils or the second set of coils.

3. The system of claim 1, the system further comprising a rectifier configured to receive AC output power at an output of at least one of the first set of coils or the second set of coils, and convert the AC output power into DC output power.

4. The system of claim 3, the system further comprising an output inverter configured to synchronize the system with the load, wherein the output inverter is further configured to receive the DC output power, convert the DC output power into AC load power, and provide the AC load power to the load.

5. The system of claim 4, wherein the output inverter is further configured to transmit a portion of the AC load power into an input of the first set of coils.

6. The system of claim 1, the system further comprising a third set of coils configured to receive excess power from the first set of coils and feed the excess power back into an input of the first set of coils.

7. The system of claim 1, wherein the load comprises a power grid.

8. A system to generate power, the system comprising:
a plurality of induction coils configured to provide power to a load, the plurality of induction coils comprising:
    a first set of induction coils configured to receive power from a power source and generate a first set of magnetic fields;
    a second set of induction coils configured to generate a second set of magnetic fields to vary an intensity of the first set of magnetic fields;
    a third set of induction coils configured to generate a third set of magnetic fields to oppose the first set of magnetic fields;
    a fourth set of induction coils configured to receive input from the load and tune the second set of induction coils, wherein tuning the second set of induction coils reduces harmonic distortion of the first set of magnetic fields; and
    a fifth set of induction coils coupled between the third set of induction coils and the fourth set of induction coils and configured to vary an intensity of the third set of magnetic fields.

9. The system of claim 8, wherein the power source converts DC power into AC power for use as excitation energy for at least one of the plurality of induction coils.

10. The system of claim 8, further comprising a plurality of rectifiers configured to receive AC output power from at least one of the plurality of induction coils and convert the AC output power into DC output power.

11. The system of claim 10, further comprising a plurality of output inverters configured to (i) synchronize the system with the load, (ii) convert the DC output power into AC load power, and (iii) provide the AC load power to the load.

12. The system of claim 11, wherein the plurality of output inverters are further configured to transmit a portion of the AC load power to an input of the first set of induction coils.

13. The system of claim 8, further comprising a sixth set of induction coils configured to receive excess power from the load and feed the excess power back into an input of the first set of induction coils.

14. The system of claim 8, wherein the load comprises a power grid.

15. A power generation system, the system comprising:
a first set of coils configured to provide power to a load, the first set of coils comprising:
    a first coil configured to receive an input power source and generate a first magnetic field;
    a second coil configured to generate a second magnetic field, the second magnetic field varying an intensity of the first magnetic field with time; and
    a third coil configured to generate a third magnetic field, the third magnetic field in opposition to the first magnetic field;
a second set of coils configured to vary the power of the first set of coils by tuning the first set of coils to the load, the second set of coils comprising:
    a fourth coil shunted to the load and the second coil, the fourth coil tuning the first set of coils by coupling the load to the second coil to reduce harmonic distortion of the first magnetic field; and
    a fifth coil magnetically coupled to the fourth coil and shunted to the third coil, the fifth coil configured to vary an intensity of the third magnetic field; and
a third set of coils configured to receive excess power from the first set of coils and feed the excess power back into an input of the first set of coils.

16. The system of claim 15, the system further comprising an input inverter configured to receive power from a DC power source and convert the power into AC power for use as an excitation energy for at least one of the first set of coils or the second set of coils.

17. The system of claim 15, the system further comprising a rectifier configured to receive AC output power at an output of at least one of the first set of coils or the second set of coils, and convert the AC output power into DC output power.

18. The system of claim 17, the system further comprising an output inverter configured to synchronize the system with the load, wherein the output inverter is further configured to receive the DC output power, convert the DC output power into AC load power, and provide the AC load power to the load.

19. The system of claim 18, wherein the output inverter is further configured to transmit a portion of the AC load power into an input of the first set of coils.

20. The system of claim 15, wherein the load comprises a power grid.

* * * * *